United States Patent
Samayamantry et al.

(10) Patent No.: US 8,249,238 B2
(45) Date of Patent: Aug. 21, 2012

(54) DYNAMIC KEY EXCHANGE FOR CALL FORKING SCENARIOS

(75) Inventors: Mallikarjuna Samayamantry, Delray Beach, FL (US); Johannes Ruetschi, Boca Raton, FL (US); Dennis L. Kucmerowski, Delray Beach, FL (US); Holger Prange, München (DE)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 474 days.

(21) Appl. No.: 11/524,802

(22) Filed: Sep. 21, 2006

(65) Prior Publication Data
US 2008/0123849 A1 May 29, 2008

(51) Int. Cl.
*H04M 3/42* (2006.01)
(52) U.S. Cl. ............. 379/207.11; 379/93.02; 379/93.03; 379/207.02; 380/257; 380/277; 380/281; 713/168; 713/171
(58) Field of Classification Search .................. 370/230, 370/352, 467; 379/229, 90.02, 93.01, 93.02, 379/93.03, 207.02, 207.11; 345/589; 380/247, 380/257, 279, 282; 713/168, 171
See application file for complete search history.

(56) References Cited

U.S. PATENT DOCUMENTS

| | | | | |
|---|---|---|---|---|
| 5,699,421 A * | 12/1997 | Nirshberg et al. | ............ | 379/386 |
| 6,104,359 A * | 8/2000 | Endres et al. | ............ | 345/589 |
| 6,434,143 B1 * | 8/2002 | Donovan | ............ | 370/356 |
| 7,002,912 B2 * | 2/2006 | Wengrovitz | ............ | 370/230 |
| 7,032,242 B1 * | 4/2006 | Grabelsky et al. | ............ | 726/11 |
| 7,082,200 B2 * | 7/2006 | Aboba et al. | ............ | 380/273 |
| 2003/0040903 A1 * | 2/2003 | Gerson | ............ | 704/211 |
| 2003/0043992 A1 * | 3/2003 | Wengrovitz | ............ | 379/229 |
| 2003/0095569 A1 * | 5/2003 | Wengrovitz et al. | ............ | 370/467 |
| 2005/0135622 A1 * | 6/2005 | Fors et al. | ............ | 380/268 |
| 2006/0236088 A1 * | 10/2006 | Walter | ............ | 713/150 |
| 2007/0157026 A1 * | 7/2007 | Zimmermann | ............ | 713/171 |
| 2007/0201512 A1 * | 8/2007 | Mills et al. | ............ | 370/467 |
| 2007/0283159 A1 * | 12/2007 | Borsa et al. | ............ | 713/182 |

FOREIGN PATENT DOCUMENTS

CN 1564514 A 1/2005

OTHER PUBLICATIONS

Network Working Group, Mikey; Multimedia Internet Keying, RFC 3830, The Internet Society, Sections 1.3, 3.2-3.3, 6.13-6.14, and 9.1-9.6; Date Aug. 2004.*
Secure VoIP: Call Establishment and Media Protection by Johan Bilien, Erik Eliasson, Joachi M. Orrblad, Jon-Oloy Vatn, Royal Institute of Technology (KTH), Stockholm, Sweden; 2nd Workshop on Securing Voice Over IP, Jun. 2005, XP007902427, Washington, D.C.
On the Applicability of Various MIKEY Modes and Extensions, Siemens, D. Ignjatic, PolyCom; IETF Standard-Working-Draft, Internet Engineering Task Force, IETF, CH, vol. Msec, No. 2, Aug. 18, 2006.

(Continued)

*Primary Examiner* — Khai N Nguyen

(57) ABSTRACT

In some embodiments, a call forking dynamic key exchange system may include one or more of the following features: (a) a memory comprising, (i) a dynamic key exchange program that allows a caller to initiate a call having a security request to multiple subscribers and selecting at least one subscriber who answers the call, and (b) a processor coupled to the memory that executes the dynamic key exchange program.

16 Claims, 7 Drawing Sheets

OTHER PUBLICATIONS

Session Initiation Protocol Service Examples draft-ietf-sipping-service-examples, A Johnston, Worldcom, R. Sparks, C. Cunningham, S. Donovan, Dynamic Soft, K. Summers, Sonus; IETF Standard-Working-Draft, Internet Engineering Task Force, IETF, CH, vol. Sipping, No. 4, Feb. 2003 (Part 1, pp. 1-75).

Session Initiation Protocol Service Examples draft-ietf-sipping-service-examples, A Johnston, Worldcom, R. Sparks, C. Cunningham, S. Donovan, Dynamic Soft, K. Summers, Sonus; IETF Standard-Working-Draft, Internet Engineering Task Force, IETF, CH, vol. Sipping, No. 4, Feb. 2003 (Part 2, pp. 76-155).

International Search Report for PCT/US2006/038417 dated Jun. 19, 2007.

Written Opinion of the International Searching Authority dated Jun. 19, 2007.

International Preliminary Report on Patentability dated Jan. 13, 2009.

\* cited by examiner

DYNAMIC KEY EXCHANGE FOR CALL FORKING SCENARIOS

FIELD OF THE INVENTION

This invention relates generally to the field of telecommunication data management. Specifically to Session Initiation Protocol (SIP) networks and enabled devices. More specifically to secure communications over SIP networks and enabled devices.

BACKGROUND OF THE INVENTION

In traditional circuit-switched networks, such as the Public Switched Telephony Network ("PSTN"), each user endpoint is connected to at most one switching system. In a business enterprise, a business telephone is connected to a single Private Branch Exchange ("PBX"). A PBX is an intelligent switching point within a circuit-switched network that is responsible for routing calls to a plurality of internal nodes or public destinations via a single PSTN switching system.

Newer telephony networks that employ packet-switching technologies are growing in popularity. In particular, packet-switched telephony networks that use the Internet Protocol (IP) as a network protocol for transmitting and receiving voice data are becoming more prevalent. These so-called Internet Telephony (IT) networks have the potential to offer new features and services that are currently unavailable to subscribers of circuit-switched telephony networks. Conceptually, IT Networks differ from the PSTN systems in that they generally transmit voice data exchanged between two subscriber endpoints, according to an IP format. More specifically, they encapsulate voice data into data packets, which are transmitted according to an IP format in a similar manner as textual data is transmitted from one computer to another via the internet.

The Session Initiation Protocol (SIP) is one of several protocols that may be used with the Internet Protocol to support Internet Telephony applications. The SIP specification is defined in the Internet Engineering Task Force (IETF) Request for Comments (RFC) 3261, dated June 2002; the disclosure of which is incorporated herein by reference in its entirety. SIP is an application-layer control protocol for creating, modifying, and terminating sessions between networked endpoints, which are referred to as SIP Enabled Devices, User Agents or simply SIP endpoints.

As discussed above, SIP Enabled Devices implement a network communication protocol, wherein a communication session is established for two endpoints to transmit and receive data. As such, each SIP Device in a SIP network is assigned a unique SIP address or terminal name, which is defined in a SIP Universal Resource Identifier (URI). The format of a SIP URI is similar to that of an email address, which typically includes a user name "@" a domain name, for example "sip:alice@siemens.com." SIP URI data is placed into header fields of SIP messages, for example to identify a sender and a receiver of the SIP message. For secure communications, the SIP Specification also defines a SIPS URI, for example "sips:alice@siemens.com." Accordingly, when a SIPS URI is used the SIP Enabled Device associated with the SIP URI may implement an encryption protocol for transmitting data in a secure communication session. It should be noted that the SIPS URI protocol may be used in the same way as the SIP URI The mechanism to establish secure voice over IP communication calls involves exchange of components of the security keys that are used for media encryption. The more secure key management solutions involve establishment of the keys using a key negotiation technique wherein each end of the call provides one half of the component of the key (this method is commonly known as dynamic key exchange (DKE) and employed in key management protocols such as MIKEY option 3 or SDescription).

These mechanisms require high amount of processing capacity for the originating device if a call is forked (multiple recipients are called) since the originating party must negotiate the key independently with each called device. As such these mechanisms work well for one-to-one call scenarios but not for one-to-many call scenarios like parallel ringing, pickup groups, multiple line appearances, etc. In forking scenarios the call is presented to many parties and the first one to answer determines where the call media will be established. Since SIP phones have limited processing power and SIP servers (B2BUA) do not expose multiple dialogs towards the originator these mechanisms cannot be implemented.

Therefore, it is desirable to have a system that allows a caller to initiate a secure call to multiple users over a SIP network.

SUMMARY OF THE INVENTION

These and other drawbacks in the prior art are overcome in large part by a system and method according to embodiments of the present invention.

In some embodiments, a call forking dynamic key exchange system may include one or more of the following features: (a) a memory comprising, (i) a dynamic key exchange program that allows a caller to initiate a call having a security request to multiple subscribers and selecting at least one subscriber who answers the call, and (b) a processor coupled to the memory that executes the dynamic key exchange program.

In some embodiments, a method for securing multiple-call telecommunications may include one or more of the following steps: (a) placing a call with a first half of a security key to multiple subscribers, (b) receiving a response from at least one answering subscriber, (c) terminating the call to all non-answering subscribers, (d) receiving a second half component of a security key from the one subscriber, (e) determining if the one subscriber has answered, (f) detecting an indicator to begin secure communications, (g) initiating secure media communication.

In some embodiments, a machine readable medium comprising machine executable instructions may include one or more of the following features: (a) call instructions that route a call to multiple subscribers, (b) termination instructions that terminate the call to all non-answering subscribers, (c) secure instructions that initiate secure media communications based upon an answering subscriber's security key, and (d) detect instructions that detect when the unsecured speech path has been created.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
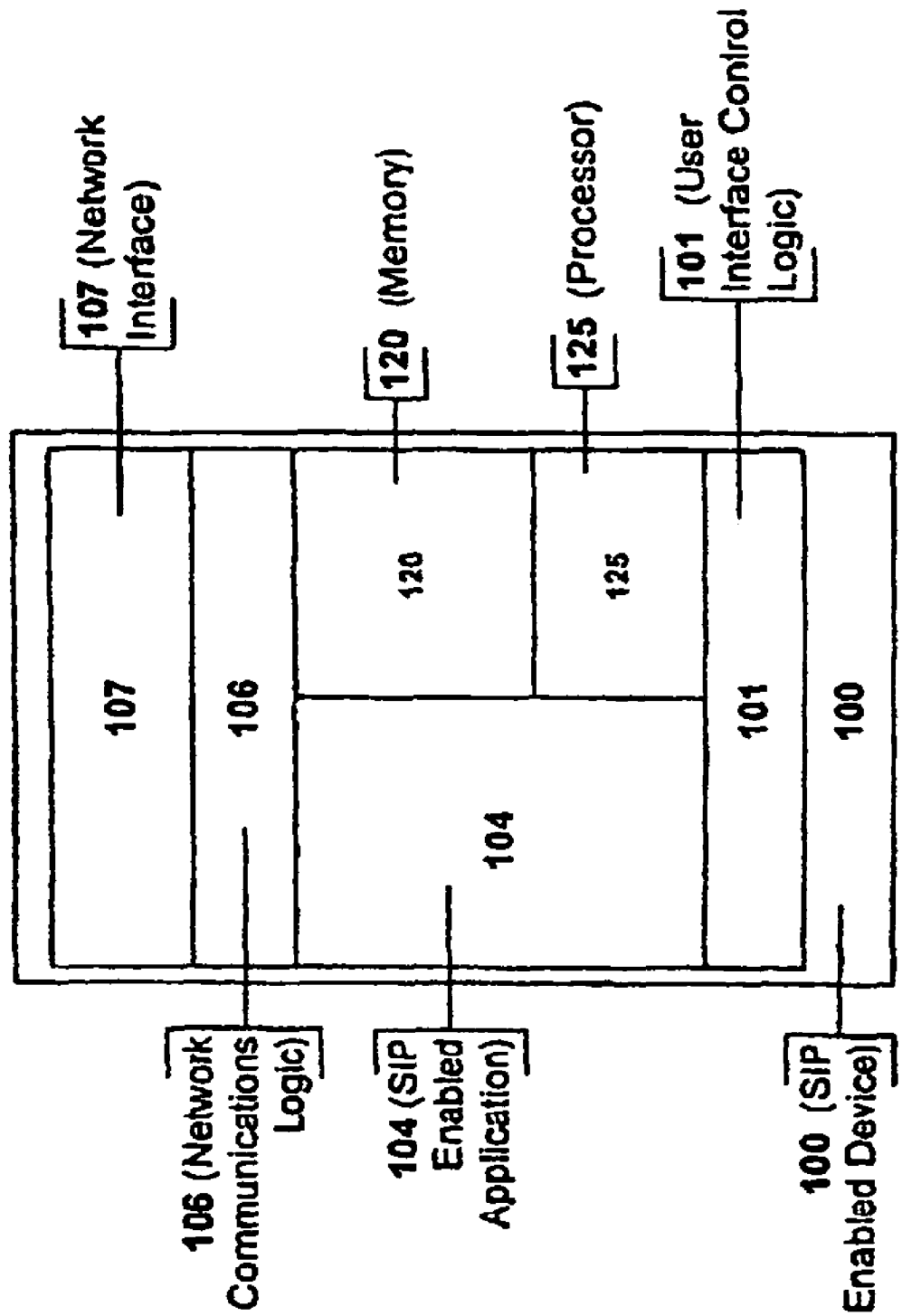
FIG. 1 shows a block diagram of software modules and hardware components implemented in a SIP Enabled Device in an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Generally, under the present invention, a SIP Enabled Device is a hardware device implementing an SIP Enabled Application module that facilitates communication sessions based on the SIP Internet Telephony communication protocol. Examples of SIP Enabled Devices include telephones, personal computers, and multimedia conferencing systems or any other type of device capable of implementing the SIP communication protocol.

Embodiments of the present invention disclose a mechanism that enables implementation of dynamic key exchange for media encryption in call forking scenarios that cannot otherwise be implemented within limited SIP devices (SIP UA (user agent) and SIP servers (B2BUA (back-to-back user agent))) processing power. An embodiment of the present invention proposes a solution that can be implemented by delaying the second half of the key exchange after call establishment. A mechanism, wherein an end-to-end call can be established employing a more secure key negotiation mechanism with half key negotiation techniques and still work for one-to-many (forking) call scenarios is employed.

Figure 2:
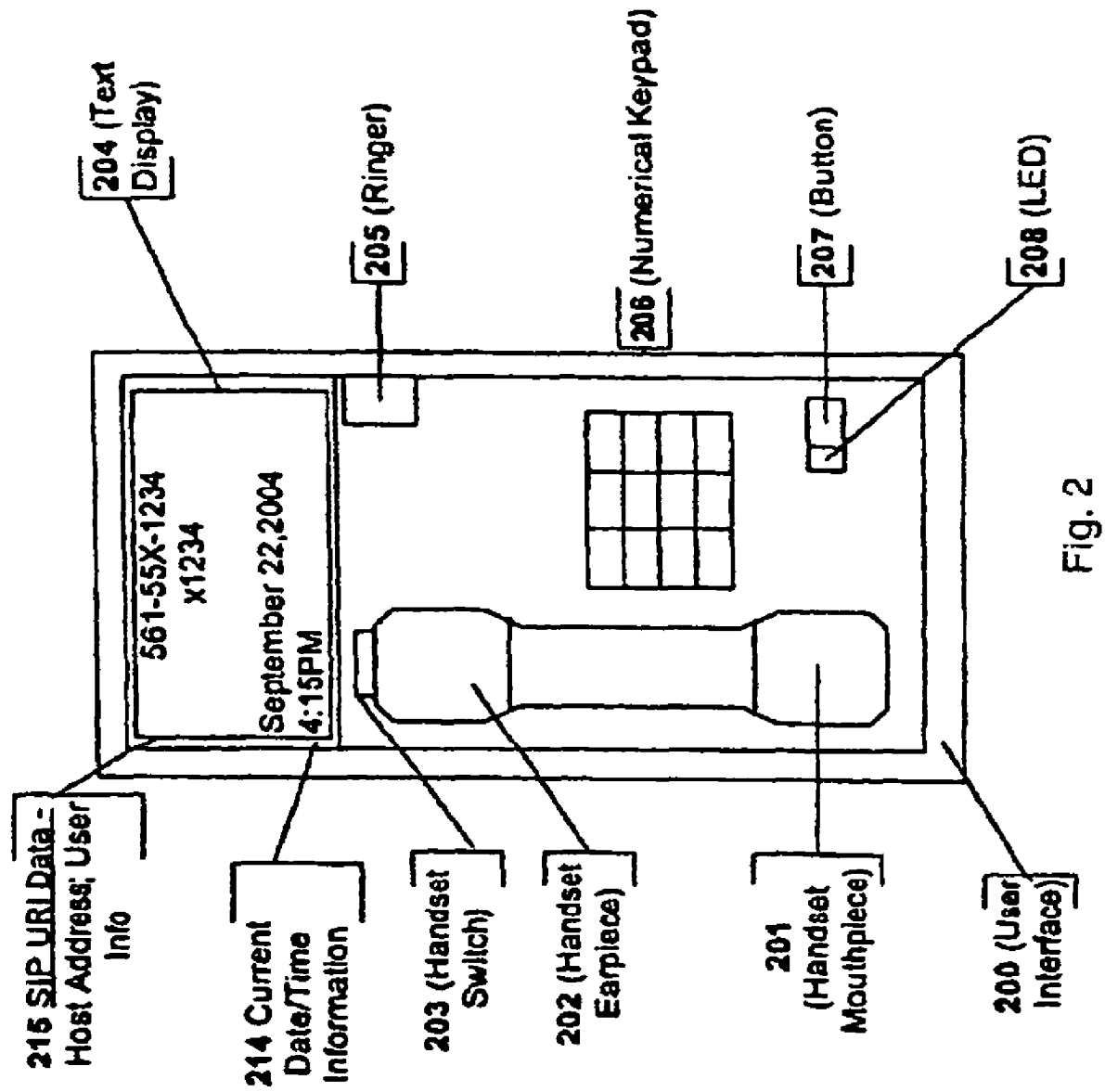
FIG. 2 shows a diagram of a user interface of a SIP Enabled Device in an embodiment of the present invention.
Figure 4:
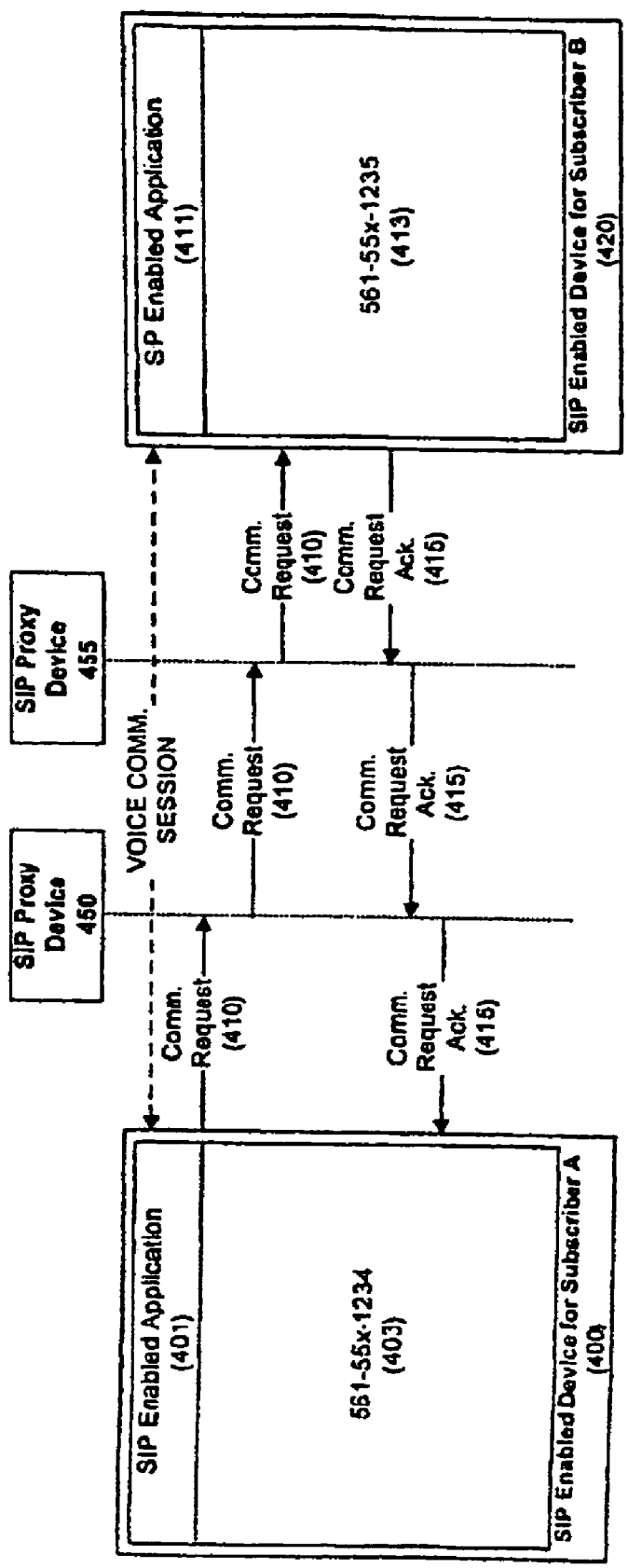
FIG. 4 shows a diagram of a communication session message exchange between two SIP Enabled Devices in an embodiment of the present invention.

Referring to FIG. 1, an SIP Enabled Device 100 is comprised of a User Interface Control Logic module 101 that interfaces with a user interface (an exemplary user interface is shown in FIG. 2 and discussed below). The User Interface Control Logic module 101 also interfaces with an SIP Enabled Application 104. SIP Enabled Application 104 implements a controller coordinating the various modules interacting within a single SIP Enabled Device 100 to send and receive SIP messages (as shown in FIG. 4 and discussed below). SIP Enabled Application 104 is also responsible for processing data from SIP communication messages and controlling additional functionality associated with SIP Enabled Device 100. SIP Enabled Application module 104 and the Network Communication Logic module 106 are modules that are stored on SIP enabled device 100 in memory 120 and executed by processor 125.

Further, the SIP Enabled Application 104 also interfaces with Network Communications Logic module 106 to send and receive non-SIP messages (not shown). Network Communications Logic module 106 implements data management and communications protocols for communicating with other network resources. Network Communications Logic module 106 interfaces with Network Interface 107, which is used to physically interface to a network (an exemplary network is shown in FIG. 3 and discussed below) that provides connectivity with other networked devices.

FIG. 2 shows an example of a User Interface 200 for an SIP Enabled Device used for Internet telephony applications. User Interface 200 is comprised of components including: handset mouthpiece 201, handset earpiece 202, handset switch 203, text display 204, ringer 205, and keypad 206, as well as user input button 207 and an LED indicator 208. A user physically manipulates the User Interface 200 components to operate the SIP Enabled Device 200 in a manner that is similar to a telephone.

SIP Enabled Device 200 may display data extracted from a SIP URI corresponding to the specific SIP Enabled Device. More specifically, one aspect of the SIP Enabled Device's SIP Enabled Application 104 is to maintain current date and/or time information 214 and display the data on text display 204. Also, SIP Enabled Application 104 may be configured to extract Host Address and/or User Information 215—data routing information, such as "561-55X-1234" and "x1234" (Terminal Number and Terminal Name) data from the SIP URI (a listing of SIP Enabled device data specific to a terminal that is used to facilitate data transmissions) for the SIP endpoint.

Figure 3:
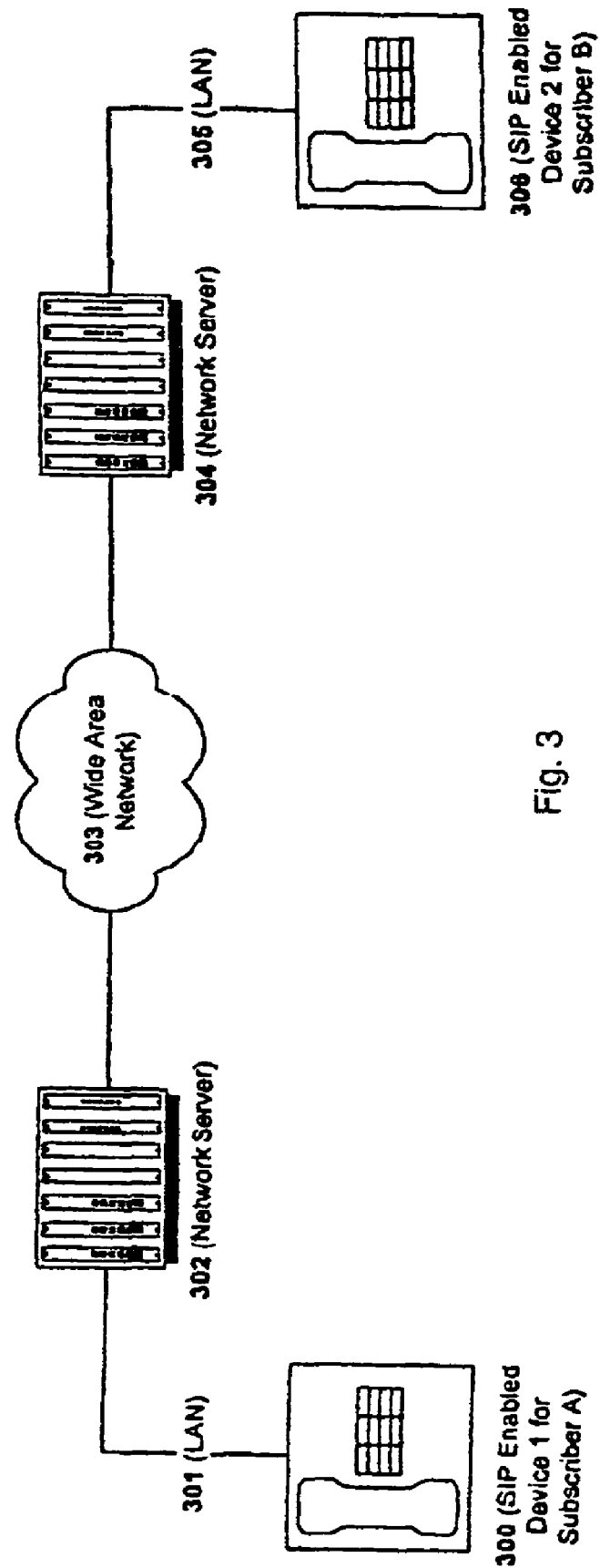
FIG. 3 shows an exemplary network of SIP Enabled Devices connected to a network for use in a SIP Enabled Internet Telephony application in an embodiment of the present invention.

FIG. 3 depicts an SIP Enabled Device network diagram illustrating exemplary devices that may be connected in a SIP network. In this example, subscriber A's SIP Enabled Device 300 is connected to a Local Area Network (LAN) 301. LAN 301, in turn, is connected to Network Server 302, which is also connected to Wide Area Network 303. Wide Area Network 303 is also connected to Network Server 304, wherein the Network Server 304 is connected to LAN 305, which is also connected to subscriber B's SIP Enabled Device 306. For illustrative simplicity, Network Servers 302 and 304 each perform the function of a SIP Proxy Server, a SIP Redirect Server, and a SIP Registrar; the functionality of which are defined in the SIP protocol specification. These Network Servers also contain additional functionality that is required for the SIP Enabled Devices to communicate; for example a Domain Name System (DNS) server, a Dynamic Host Control Protocol (DHCP) server, and a Lightweight Directory Access Protocol (LDAP) server.

FIG. 4 illustrates a generic exchange of data messages during SIP communication session creation. The SIP session shown results from subscriber A's SIP Enabled Device 400 initiating a voice call to subscriber B's SIP Enabled Device 420. For illustrative simplicity, only the SIP Enabled Application (401/411) for each SIP Enabled Device is shown. Prior to placing the voice call, subscriber A has configured the SIP Enabled Device 400 with a SIP address of "561-55x-1234" 403 (host address data from the SIP URI) and subscriber B has configured the SIP Enabled Device 420 with a SIP address of "561-55x-1235" 413.

During the SIP communication session, each SIP Enabled Application (401/411) uses these SIP addresses (403, 413) for routing data transmissions, and thereby establish and maintain a communication session. This is achieved by the respective SIP Enabled Applications interacting with a User Interface on the SIP Enabled Device to sample, encapsulate voice data for transmission on one SIP Enabled Device, while processing transmitted data packets and synthesizing the corresponding voice data on the other SIP Enabled Device. With regard to data transmission, subscriber A's SIP Enabled Application 401 communicates with subscriber B's SIP Enabled Application 411 by inserting the address (561-55x-1235) 413 into the SIP Communication Request (Comm. Request) message 410. Accordingly, in response subscriber B's SIP Enabled Application 411 prepares a Communication Request Acknowledgement response message 415 (The message exchange between the SIP Enabled Devices 400 and 420 has been modified for the purposes of illustration and simplification, for a more detailed description of the actual SIP communication protocol refer to RFC 3261.)

Figure 5:
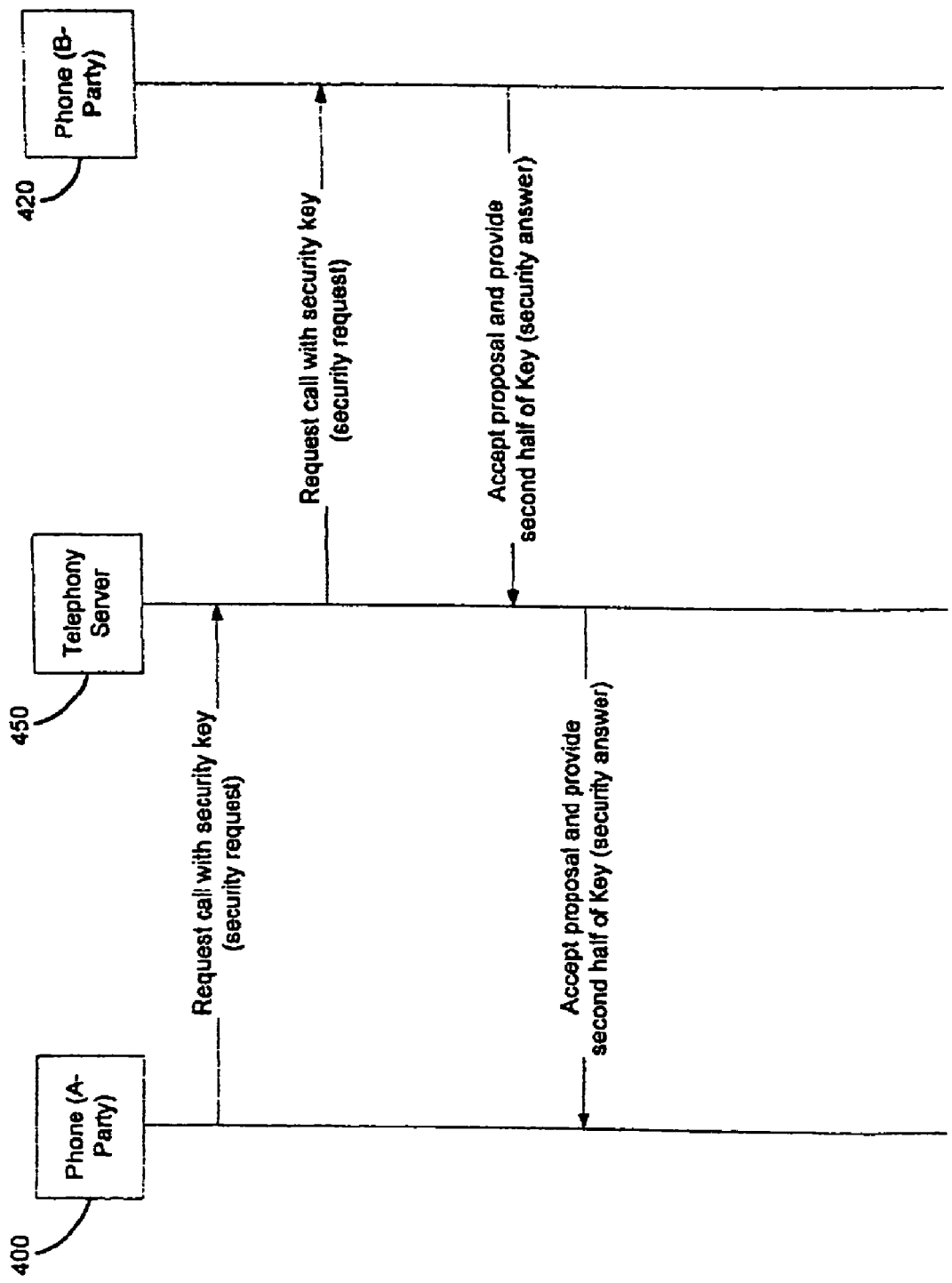
FIG. 5 shows a call flow for a secure user to user communication.

With reference to FIG. 5, a call flow for a secure user to user communication is shown. To initiate a secure SIP session with traditional DKE subscriber A 400 would pick up the phone and call the entity (s)he desired to have a secure phone conversation with. This would initiate a security request containing the first half of a secure key. Telephony server 450 would then route this request to the desired entity, in this case subscriber B 420. To accept the call, the security answer would be sent back. The security answer contains the other half of the secure key. Telephony server 450 would then route this answer back to subscriber A where it would be determined if the second half of the key was valid and if so a secure phone conversation could take place. Such a protocol can be found in the Internet Engineering Task Force (IETF) Request for Comments (RFC) 3830, dated August 2004. However, this form of DKE requires high processing power for the originating device when a call is forked since the originating party must negotiate the key independently with each called device. As such this form of DKE works well for one-to-one call scenarios but not for one-to-many call scenarios.

Figure 6:
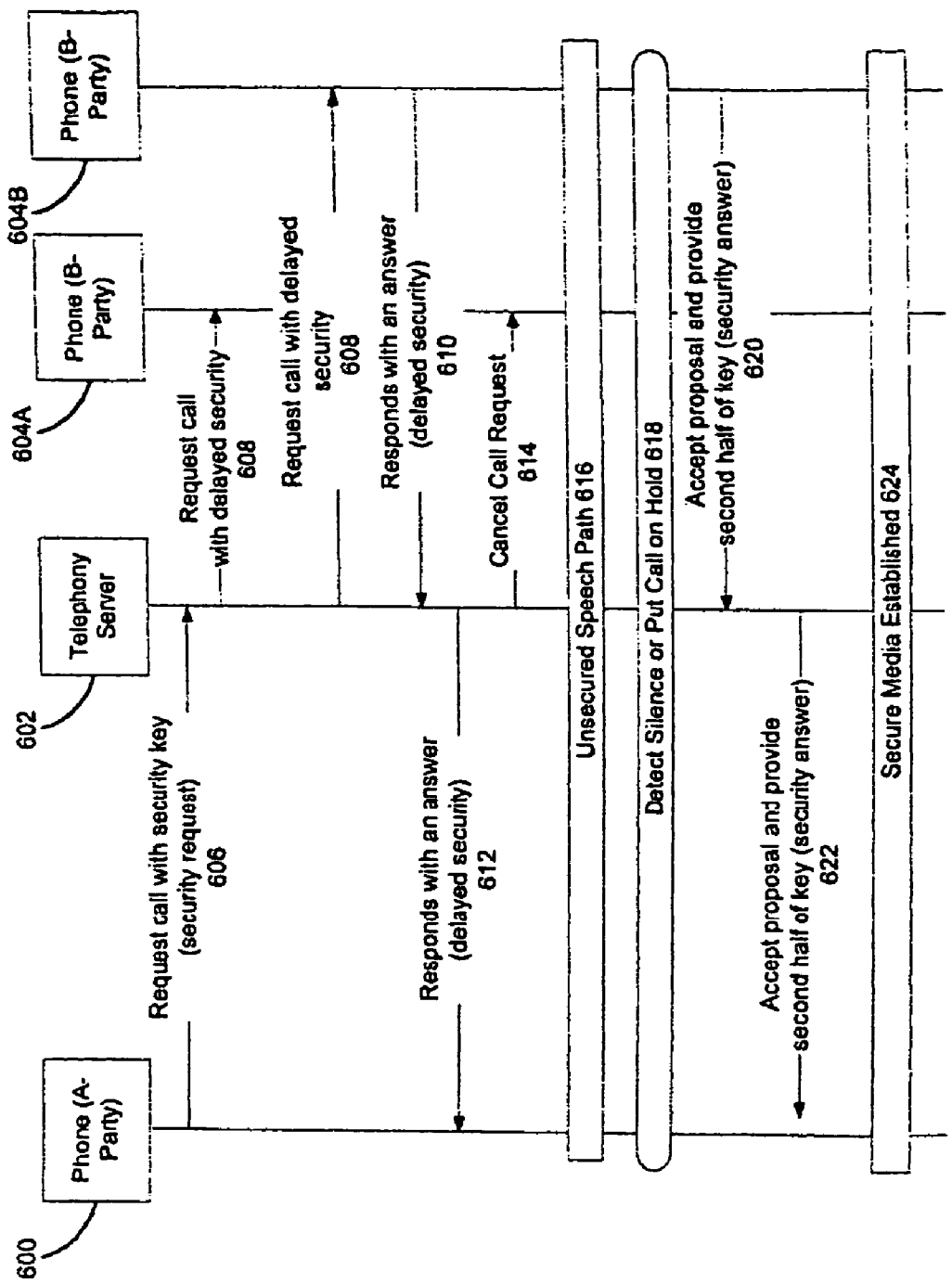
FIG. 6 shows a call flow for a secure user to multiple users call implementation in an embodiment of the present invention.
Figure 7:
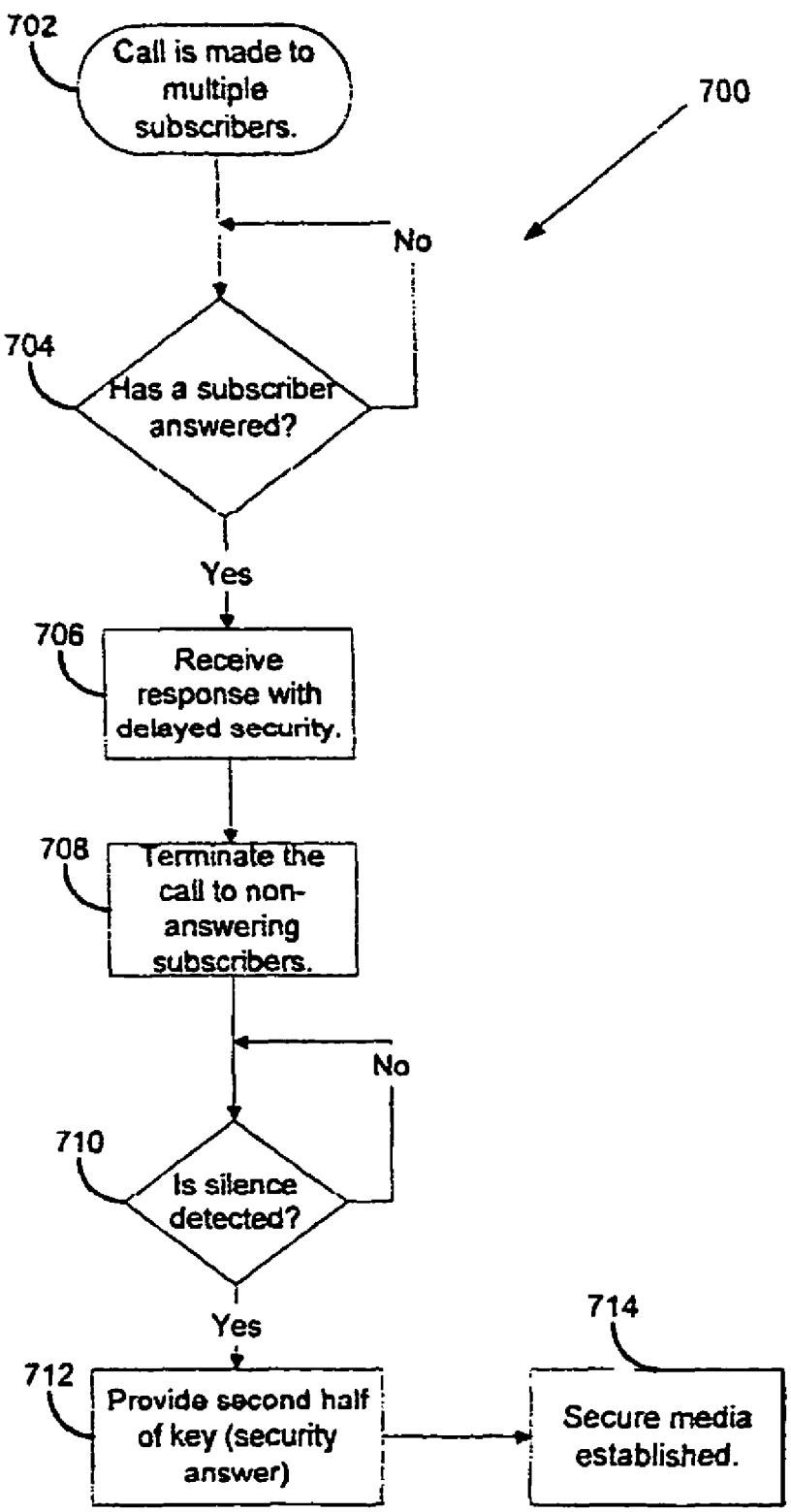
FIG. 7 shows a flow chart for a dynamic key exchange for call forking program in an embodiment of the present invention.

With reference to FIGS. 6 & 7, a call flow for a secure user to multiple users call implementation in an embodiment of the present invention is shown. DKE for call forking system 700 begins when subscriber 600 initiates a call to multiple subscribers at state 702. This causes a request call to go out with a first half of the security key attached 606. Telephony server 602 then relays this message to subscribers 604A and 604B at 608. A first half of the security key is passed along to all forked destinations but the destinations are instructed not to respond with the second half of the key until the call has been answered and subsequently a period of silence is detected enabling the answering destination to send the second half of the key. System 700 then determines if any subscriber has answered at state 704. If no subscriber has answered, system 700 routes back to state 704 to inquire again. If a subscriber answers, system 700 proceeds to state 706 where a response with delayed security is sent to telephony server 602 at 610. Response 610 from the answering party indicates to phone 600 that security is pending. Typically securing a phone call can occur very quickly and therefore user interface 600 may not require this information. However, if the call were a data call, e.g., fax, the calling party could delay sending information and have some quiet time so security could be negotiated prior to sending data. Telephony server 602 then relays this message to subscriber 600 at 612. At state 708 all calls to non-answering subscribers is terminated 614.

An unsecured speech path 616 has now been created. System 700 then determines at state 710 if silence can be detected 618 on unsecured speech path 616. It is contemplated that any method of determining when a secure media can be established is fully contemplated, such as putting the caller and subscriber on hold, without departing from the spirit of the invention. If silence is not detected, then system 700 routes back and continues to ask the question at state 710. If silence is detected, then system 700 can proceed to state 712 where the second half of the security key is provided by subscriber 604B at 620. Server 602 then relays the second half of the security key to caller 600 at 622. Once again, if the second half of the security key is valid, then secure media 624 can be established at state 714.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A call forking dynamic key exchange system comprising:
   a first communication device that sends a call request to a plurality of destination devices, the call request comprising a first half of a security key;
   a telephony server that forwards the call request and instructs the plurality of destination devices not to respond with a second half of the security key until at least one destination device of the plurality of destination devices answers the call request and a period of silence is detected on an unsecured speech path between the first communication device and the at least one answering destination device;
   wherein the telephony server determines if the at least one destination device answers the call request; and
   wherein if the at least one destination device answers the call request:
      the telephony server creates the unsecured speech path between the first communication device and the at least one answering destination device,
      the telephony server determines if silence is detected on the unsecured speech path,
      if silence is detected on the unsecured speech path the at least one answering destination device provides the second half of the security key to the telephony server,
      the telephony server establishes a secure media connection if the second half of the security key is determined to be valid, and
      if silence is not detected the telephony server repeatedly determines if silence is detected on the unsecured speech path for a predetermined period of time; and
   wherein if the at least one destination device does not answer the call request:
      the telephony server repeatedly determines if the at least one destination device answers the call request for a predetermined amount of time and terminates the call request to any of the plurality of destination devices that do not answer the call request in the predetermined amount of time.

2. The system of claim 1 wherein the telephony server places the first communication device and the at least one answering destination device on hold to determine determines if silence is detected on the unsecured speech path.

3. The system of claim 1 wherein the call request is a Session Initiation Protocol ("SIP") call request.

4. The system of claim 1 wherein the telephony server comprises a Private Branch Exchange ("PBX").

5. The system of claim 1 wherein the call request comprises a Voice over Internet Protocol ("VoIP") call request.

6. The system of claim 1 wherein the call request comprises a call request for a data call.

7. The system of claim 1 wherein the first communication device is an SIP enabled device.

8. The system of claim 1 wherein the plurality of destination devices are SIP enabled devices.

9. A method for securing multiple call telecommunications comprising:
- a first communication device sending a call request with a first half of a security key to a telephony server;
- the telephony server forwarding the call request to a plurality of destination devices and instructing the destination devices not to respond with a second half of the security key until at least one destination device of the plurality of destination devices answers the call request and a period of silence is detected on an unsecured speech path between the first communication device and the at least one answering destination device;
- the telephony server determining if at least one destination device of the plurality of destination devices answers the call request;
- if the at least one destination device answers the call request:
    - the telephony server creating the unsecured speech path between the first communication device and the at least one answering destination device,
    - the telephony server determining if silence is detected on the unsecured speech path,
    - if silence is detected, the at least one answering destination device providing the second half of the security key to the telephony server, and the telephony server establishing a secure media connection between the first communication device and the at least one answering destination device if the second half of the security key is determined to be valid,
    - if silence is not detected, the telephony server repeating the step of determining if silence is detected on the unsecured speech path; and
- if the at least one destination device has not answered the call request, the telephony server repeating the step of determining if at least one destination device of the plurality of destination devices answers the call request; and
- the telephony server terminating the call request to any of the plurality of destination devices that did not answer the call request.

10. The method of claim 9 wherein determining if silence is detected on the unsecured speech path comprises the telephony server placing the first communication device and the at least one answering destination device on hold and detecting silence on the unsecured speech path.

11. The method of claim 9 wherein the call request is a SIP call request.

12. The method of claim 9 wherein the telephony server comprises a Private Branch Exchange ("PBX").

13. The method of claim 9 wherein the call request comprises a Voice over Internet Protocol ("VoIP") call request.

14. The method of claim 9 wherein the call request comprises a call request for a data call.

15. The method of claim 9 wherein the first communication device is an SIP enabled device.

16. The method of claim 9 wherein the plurality of destination devices are SIP enabled devices.

* * * * *